United States Patent
Dong

(10) Patent No.: US 10,862,858 B2
(45) Date of Patent: Dec. 8, 2020

(54) INFORMATION CENTRIC APPROACH IN ACHIEVING ANYCAST IN MACHINE TYPE COMMUNICATIONS

(71) Applicant: Futurewei Technologies, Inc., Plano, TX (US)

(72) Inventor: Lijun Dong, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 124 days.

(21) Appl. No.: 15/936,133

(22) Filed: Mar. 26, 2018

(65) Prior Publication Data
US 2018/0316645 A1   Nov. 1, 2018

Related U.S. Application Data

(60) Provisional application No. 62/478,326, filed on Mar. 29, 2017.

(51) Int. Cl.
*H04L 29/12* (2006.01)
*H04W 4/70* (2018.01)

(52) U.S. Cl.
CPC .............. *H04L 61/20* (2013.01); *H04L 61/30* (2013.01); *H04W 4/70* (2018.02); *H04L 61/1582* (2013.01)

(58) Field of Classification Search
CPC ..... H04L 61/20; H04L 61/30; H04L 61/1582; H04W 4/70
See application file for complete search history.

(56) References Cited

U.S. PATENT DOCUMENTS

| | | | | |
|---|---|---|---|---|
| 2016/0006815 A1* | 1/2016 | Dong | ..................... | G06F 9/46 709/204 |
| 2016/0007138 A1* | 1/2016 | Palanisamy | ............. | H04W 4/70 455/41.2 |
| 2016/0100350 A1* | 4/2016 | Laraqui | ............... | H04M 7/0012 370/328 |
| 2016/0156513 A1* | 6/2016 | Zhang | ..................... | H04W 4/70 709/220 |

(Continued)

OTHER PUBLICATIONS

3rd Generation Partnership Project; Technical Specification Group Services and System Aspects; Service requirement for Machine-Type Communications, (MTC); Stage 1, Release 14, 2017, 26 pages.

(Continued)

*Primary Examiner* — Nicholas R Taylor
*Assistant Examiner* — Michael Li
(74) *Attorney, Agent, or Firm* — Vierra Magan Marcus LLP

(57) ABSTRACT

The disclosure relates to technology for machine type communication (MTC) in an information centric network. A record is stored that identifies multiple MTC devices having one or more of the same functions. The multiple MTC devices form a group with a unique name. The group of MTC devices is managed to add one or more other connected MTC devices to the information centric network, where the one or more other connected MTC devices have one or more of the same functions as the MTC devices already included in the group. A message is then published in the information centric network, where the message includes a unique name of the group of MTC devices and an address of a next hop towards the group of MTC devices.

18 Claims, 16 Drawing Sheets

(56) References Cited

U.S. PATENT DOCUMENTS

2018/0097722 A1* 4/2018 Callard .................. H04L 45/38

OTHER PUBLICATIONS

Amadeo et al., "Named Data Networking for IoT: an Architectural Perspective," IEEE, 2014, 5 pages.

Ashwood-Smith, "Report on Standards Gap Analysis," International Telecommunication Union, 2013-2016, 172 pages.

Baccelli et al., "Information Centric Networking in the IoT: Experiments with NDN in the Wild," 10 pages.

Blefari Melazzi et al., "Publish/Subscribe Over Information Centric Networks: A Standardized Approach in CONVERGENCE," Future Network Mobile Summit (FutureNetw), Berlin, Germany, 2012 8 pages.

Dannewitz et al., "Network of Information (NetInf)—An information-centric networking architecture," Computer Communications, 2013, 15 pages.

Fotiou et al., "Developing information networking further: from PSIRP to PURSUIT, " Research Gate, 2010, 14 pages.

Koponen et al., "A Data-Oriented (and Beyond) Network Architecture," SIGCOMM '07, Aug. 27-31, 2017, 12 pages.

Metz, "IP Anycast Point-to-(Any) Point Communicaiton," IEEE, 2002, 5 pages.

Taleb et al., "Machine Type Communications in 3GPP Networks: Potential, Challenges, and Solutions," IEEE, 2012, 7 pages.

Xylomenos et al., "A Survey of Information-Centric Networking Research," IDD, vol. 16, No. 2, 2014, 26 pages.

Zhang et al., "Named Data Networking (NDN) Project," NDN, Oct. 31, 2010, 26 pages.

* cited by examiner

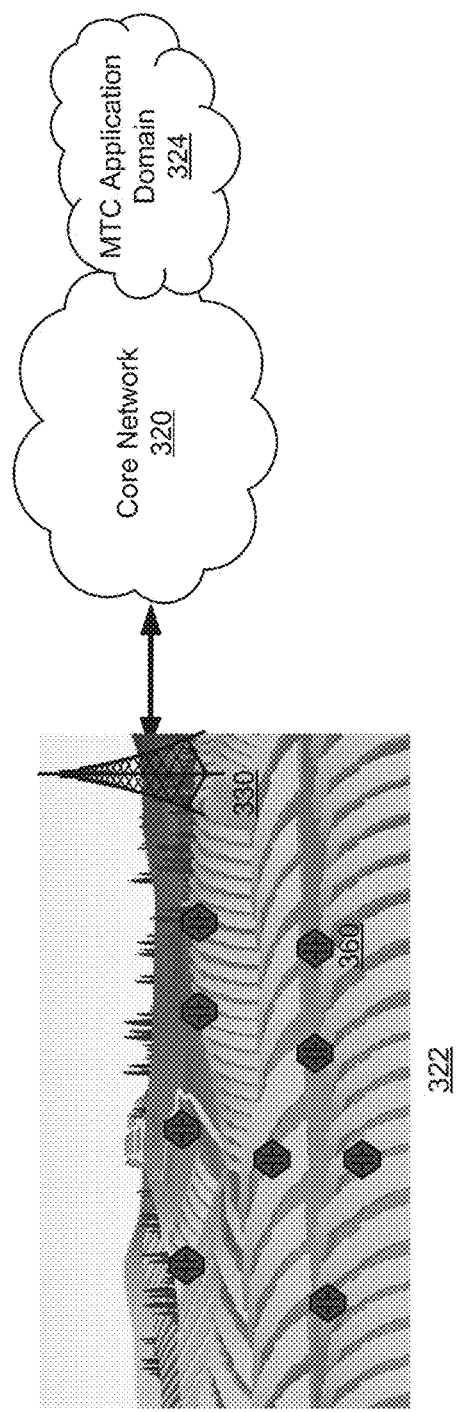
FIG. 5A
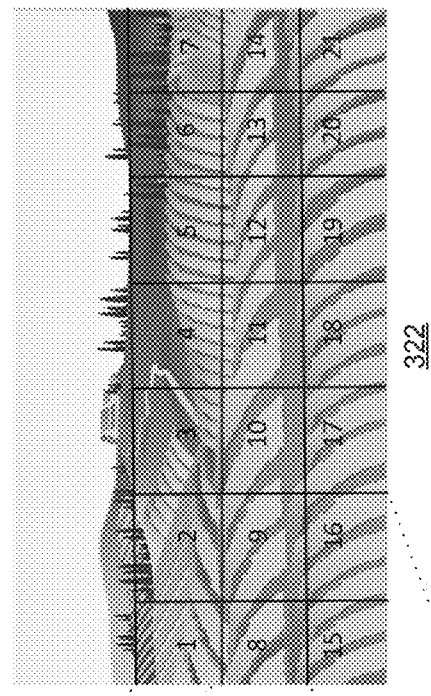
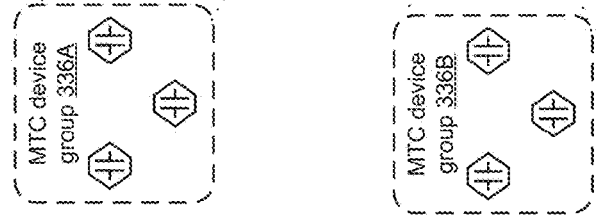
FIG. 5B

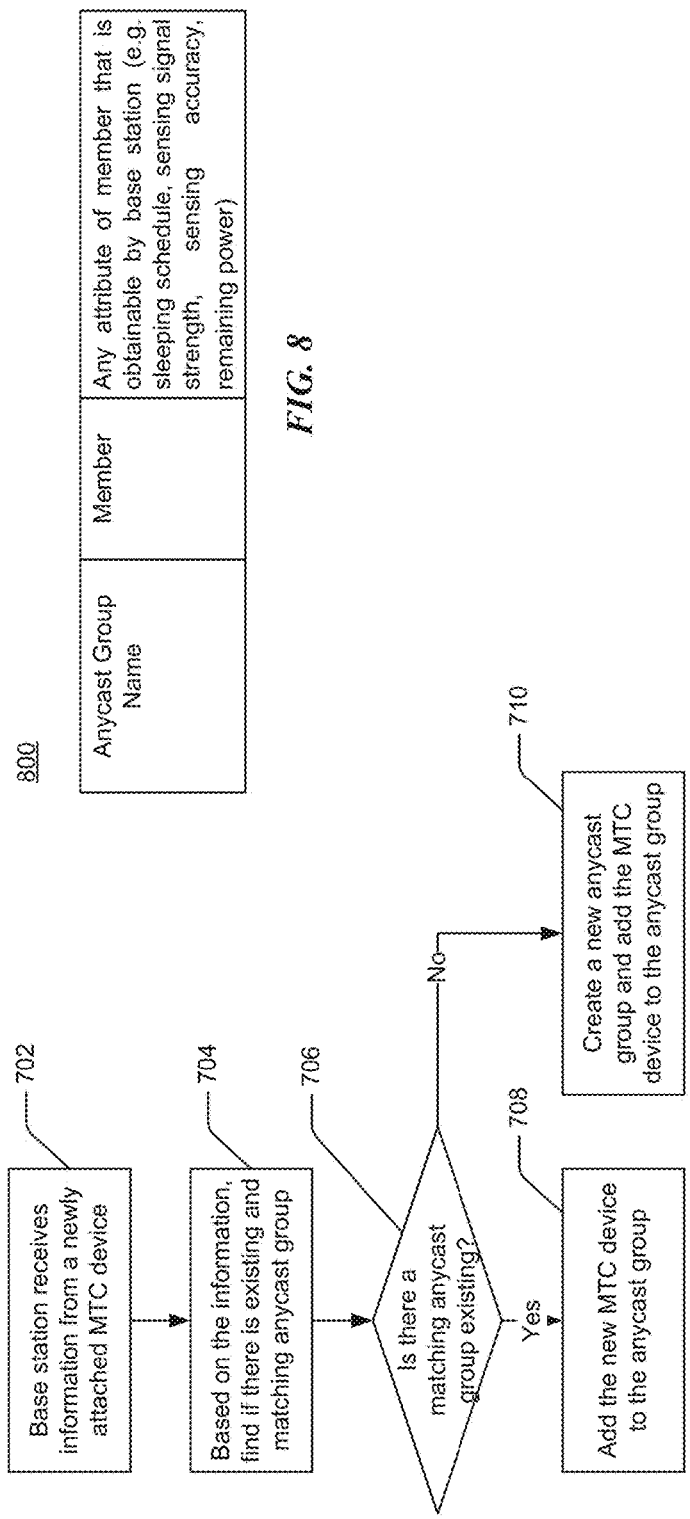
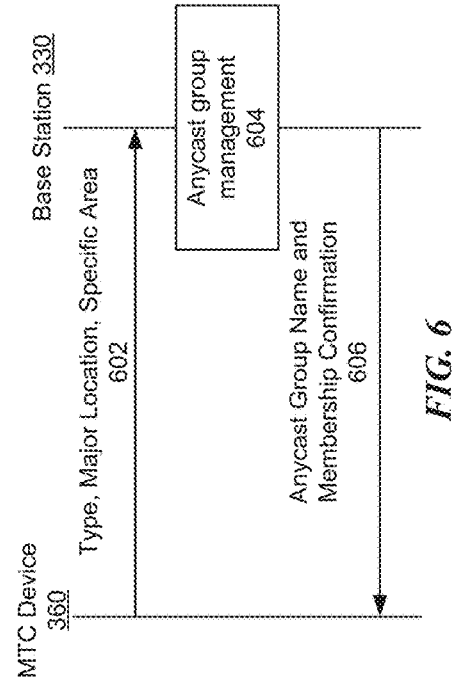

| Variable Description | Value |
|---|---|
| The size of the member device registration message in the application level anycast provided by the MTC server | 160 bytes |
| The size of the member MTC device' information update message | 40 bytes |
| The size of the anycast group propagation message in the proposed information centric approach | 26 bytes |
| The number of network hops between the base statopm and the MTC server | 10 |
| The number of base station considered in the evaluation | 100 |

INFORMATION CENTRIC APPROACH IN ACHIEVING ANYCAST IN MACHINE TYPE COMMUNICATIONS

CLAIM FOR PRIORITY

This application claims the benefit of priority to U.S. Provisional Application Ser. No. 62/478,326, filed Mar. 29, 2017, the contents of which are hereby incorporated by reference.

FIELD

The disclosed technology relates to machine type communication (MTC) in an information centric network.

BACKGROUND

In an Information-Centric Network (ICN), also referred to as a content oriented network (CON), a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network. In the ICN, content delivery including publishing, requesting, managing (e.g., modification, deletion, etc.) may be based on content name as opposed to content location.

One aspect of the ICN that may be different from traditional Internet Protocol (IP) networks is the ability of the ICN to interconnect multiple geographical points and cache content temporarily or store content on a more persistent basis. This may allow content to be served from the network instead of an original server. Accordingly, the caching/storing may be used for real time data that is fetched by the user or for persistent data that belongs to the user or to a content provider, e.g., a third party provider. The ICN approach is being developed in several projects, such as Data-Oriented Network Architecture (DONA), Publish Subscribe Internet Technology (PURSUIT), Scalable and Adaptive Internet Solutions (SAIL), CONVERGENCE and Named Data Networking (NDN).

BRIEF SUMMARY

According to one aspect of the present disclosure, there is provided a method for machine type communication (MTC) in an information centric network that includes storing a record identifying multiple MTC devices having one or more of the same functions, the multiple MTC devices forming a group with a unique name; managing the group of MTC devices to add one or more other connected MTC devices to the information centric network, the one or more other connected MTC devices having one or more of the same functions as the MTC devices already included in the group; and publishing a message in the information centric network, the message including the unique name of the group of MTC devices and an address of a next hop towards the group of MTC devices.

Optionally, in any of the preceding aspects the method further includes adding an entry into a forwarding table that includes the unique name of the group and the address of the next hop towards the group of MTC devices.

Optionally, in any of the preceding aspects the method further includes receiving an interest message including the record with the unique name of the group; matching the group of MTC devices corresponding to the unique name in the interest message with entries in a forwarding table; and forwarding the interest message to one or more of the MTC devices in the group of MTC devices based on the entries in the forwarding table.

Optionally, in any of the preceding aspects the method further includes excluding inactive MTC devices in the group of MTC devices when forwarding the interest message; and selecting one or more of the MTC devices in the group of MTC devices having at least one of a highest sensing accuracy, strongest signal strength and largest remaining power of the MTC devices in the group of MTC devices.

Optionally, in any of the preceding aspects, the interest message is received from one of a MTC server and a MTC device not in the group of MTC devices.

Optionally, in any of the preceding aspects, the selected one or more MTC devices replies to the interest message with a data packet including content request in the interest message.

Optionally, in any of the preceding aspects, wherein the unique name of the group includes a type field identifying one or more sensing functions of the MTC devices, a main location field indicating a location of the MTC devices in the group, and a specific area field indicating an area within the main location field in which each MTC device in the group is located.

Optionally, in any of the preceding aspects the method further includes receiving information from the newly added MTC device in the network; determining whether a group with the same one or more sensing functions exists as the record and matches the newly added MTC device; and adding the MTC to the group in the record when the group exists and creating a new group of MTC devices as a record when the group does not exist.

Optionally, in any of the preceding aspects, the record includes the unique name, the MTC devices in the group and one or more attributes identifying the MTC devices in the group.

According to one other aspect of the present disclosure, there is provided a base station for machine type communication (MTC) in an information centric network, including a memory storage comprising instructions; and one or more processors coupled to the memory that execute the instructions to: store a record identifying multiple MTC devices having one or more of the same functions, the multiple MTC devices forming a group with a unique name; manage the group of MTC devices to add one or more other connected MTC devices to the information centric network, the one or more other connected MTC devices having one or more of the same functions as the MTC devices already included in the group; and publish a message in the information centric network, the message including the unique name of the group of MTC devices and an address of a next hop towards the group of MTC devices.

According to another aspect of the present disclosure, there is provided non-transitory computer-readable medium storing computer instructions or machine type communication (MTC) in an information centric network, that when executed by one or more processors, causes the one or more processors to perform the steps of storing a record identifying multiple MTC devices having one or more of the same functions, the multiple MTC devices forming a group with a unique name; managing the group of MTC devices to add one or more other connected MTC devices to the information centric network, the one or more other connected MTC devices having one or more of the same functions as the MTC devices already included in the group; and publishing a message in the information centric network, the message including the unique name of the group of MTC devices and an address of a next hop towards the group of MTC devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 5A illustrates an example use scenario of employing an MTC network architecture.

FIG. 5B illustrates an example of an information centric approach to support the anycast service for MTC in the core network.

FIG. 6 is an example sequence diagram of an MTC device joining an anycast group.

FIG. 7 illustrates base station management of an anycast group when receiving information from a newly attached MTC device.

FIG. 8 illustrates an anycast group record stored in base station.

FIG. 14 shows variables and corresponding values applied during set up to measure performance.

DETAILED DESCRIPTION

Figure 1:
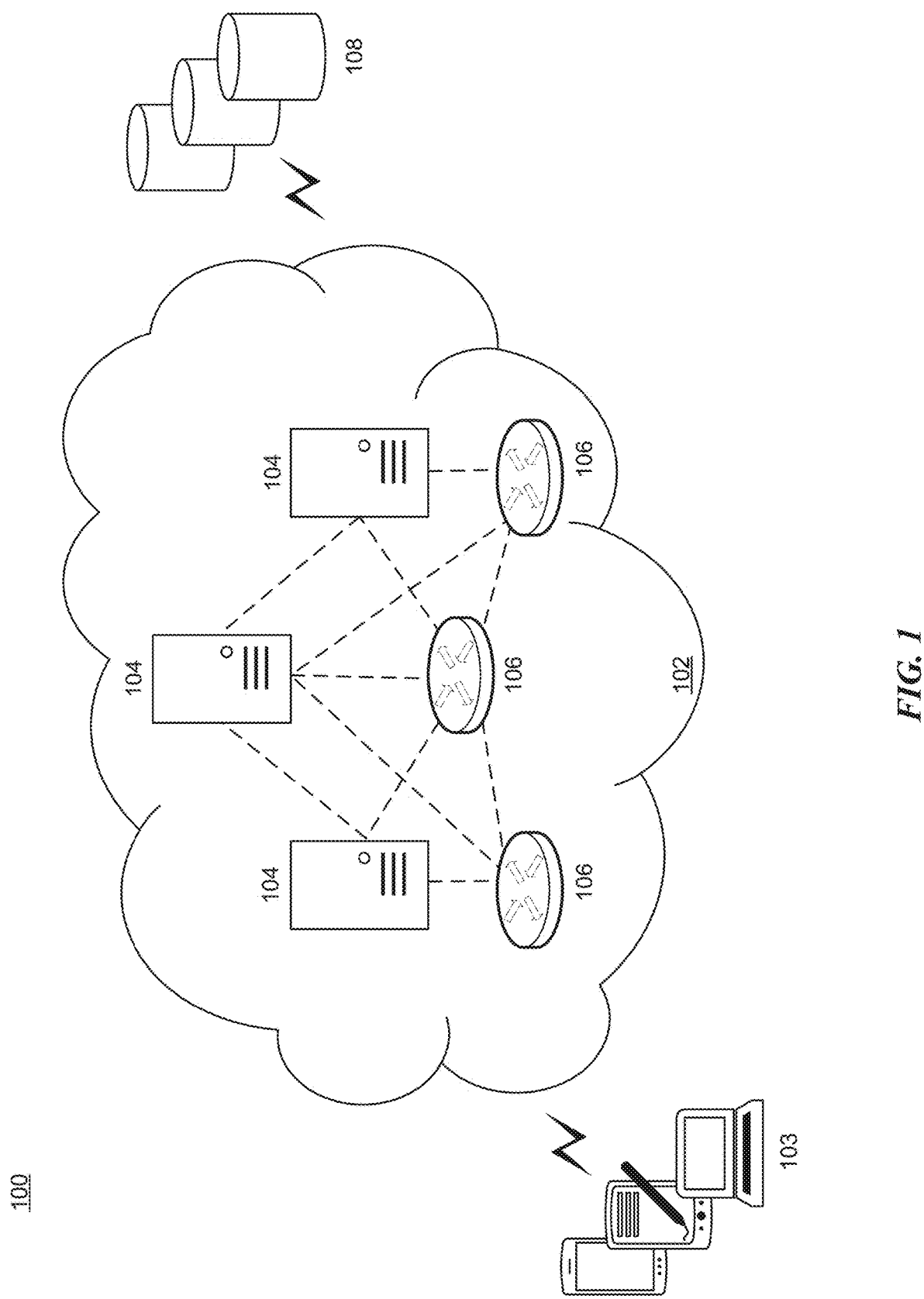
FIG. 1 illustrates a network architecture to provide content as requested by different users in an ICN.

The disclosure relates to technology for discovery and retrieval of content (data) in networks, such as ICN networks, in machine type communications (MTC) using an anycast communication paradigm.

Users often wish to discover or retrieve content from a network. This is typically accomplished by the user, via a client, sending an interest message to the network, where the interest message includes the name (or identifying information) about the content. However, currently deployed systems require significant signaling overhead and bandwidth usage in the core network, often resulting in considerable latency experienced by clients.

In the disclosed technology, a client or device may request content from the network by sending an interest message to a group of devices for data retrieval. The group of devices, such as MTC devices, is formed to create an "anycast group" (i.e., a group of MTC devices) and published to the network. In one embodiment, the anycast group may be named according to the type of data collected by the MTC devices. As anycast groups are formed, records of the anycast groups are maintained throughout the network at edge routers (e.g., base stations) such that name based routing tables are setup for the anycast groups. Using this approach, the anycast service can be realized at the network edge, which requires significantly less signaling overhead, control message overhead and consequently results in less latency experienced by the clients.

It is understood that the present disclosure may be embodied in many different forms and should not be construed as being limited to the embodiments set forth herein. Rather, these embodiments are provided so that this disclosure will be thorough and complete and will fully convey the invention to those skilled in the art. Indeed, the disclosure is intended to cover alternatives, modifications and equivalents of these embodiments, which are included within the scope and spirit of the invention as defined by the appended claims. Furthermore, in the following detailed description of the present disclosure, numerous specific details are set forth in order to provide a thorough understanding of the present disclosure. However, it will be clear to those of ordinary skill in the art that the present disclosure may be practiced without such specific details.

Information-Centric Networking (ICN) has emerged as a promising candidate for the architecture of the future Internet, as well as the future Internet of Things (IoT). Different from conventional IP routers, ICN routers may combine content routing, content computing power, and content local cache/storage capabilities. In some ICN models, such as content centric network (CCN)/named data networking (NDN) models, a content name (e.g., a prefix) may be used for content routing, which may define the content reachability to guide content retrieval from ICN routers. In some instances, internet routing protocols, such as Open Shortest Path First (OSPF) and Border Gateway Protocol (BGP), may be extended to populate a content prefix(es) to each or many ICN routers (e.g., within a network, domain, or group) for content routing and distribution.

As suggested above, ICN integrates name-based routing and in-network caching as fundamentals of the network infrastructure. One variation of ICN includes NDN. In NDN, communications are driven by receivers, i.e. data consumers, through the exchange of two types of packets: interest packets (or messages) and data packets (or messages). In an Interest message, a consumer places the name of a desired piece of data into the Interest message and sends it to the network. Routers use the name to forward the Interest toward the data producer(s). In a Data packet, once the Interest message reaches a node that has the requested data, the node will return the Data packet that contains both the name and the content, together with a signature by the producer's key which binds the two. The Data packet typically follows in reverse the path taken by the Interest message to get back to the requesting consumer. This process is described in more detail below with reference to FIG. 1.

FIG. 1 illustrates a network architecture to provide content as requested by users in an information centric network. The network environment 100 may include the ICN 102, also referred to as a content oriented network (CON), having controllers, such as ICN managers 104. The ICN managers 204 may be, for example, a network entity that may have control over a set of network resources in a data plane. In one embodiment, the ICN managers 104 maintain a synchronized record of content hosted by different network entities in the ICN 102. For example, the ICN functionalities may include ICN name resolution, routing, and management. The ICN managers 104 may be deployed in a distributed or in a centralized or in a hybrid manner depending upon the Internet Service Providers (ISP).

ICN 102 may also include routers (or nodes) 106, which may include storage to cache content as the content propagates through the ICN 102. The routers 106 may also be communicatively coupled with the ICN managers 104 and may be configured to process requests received from users for accessing the content via clients or user devices 203, such as a mobile device or computer.

Figure 2:
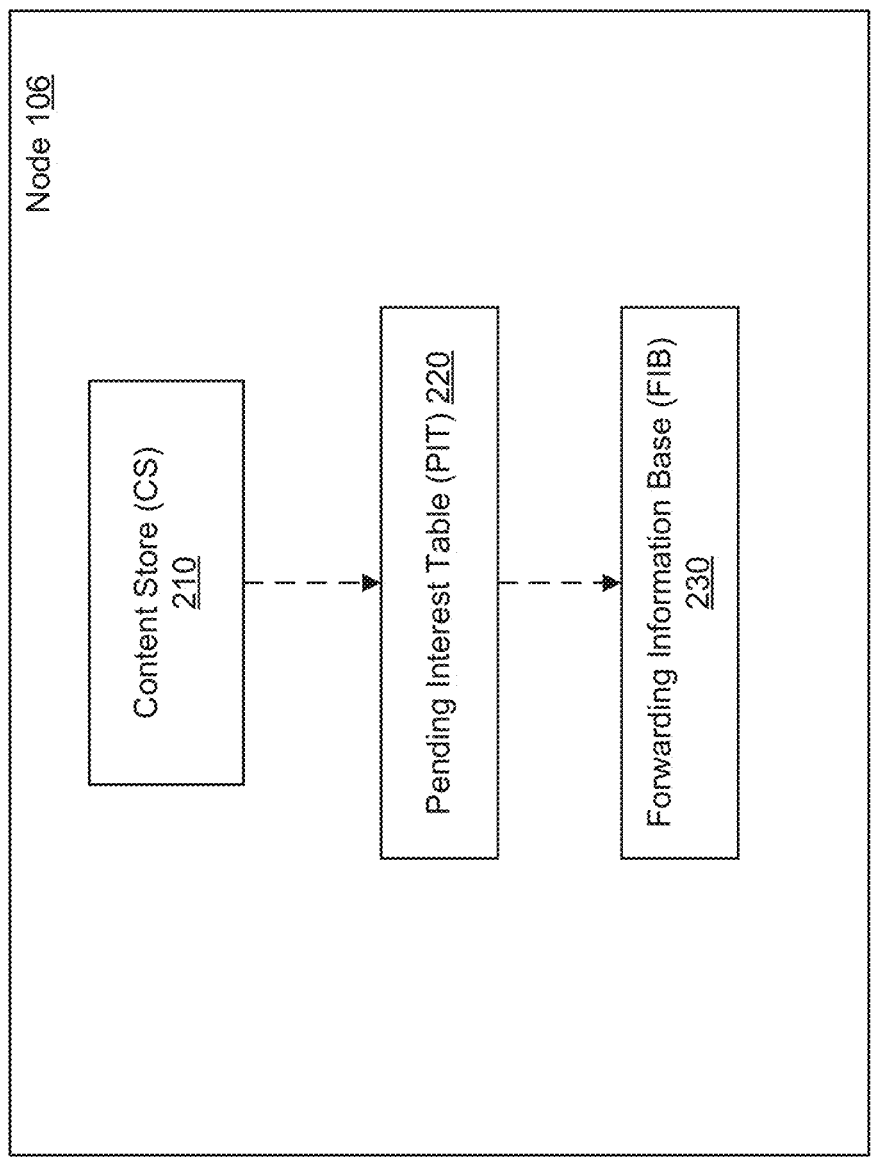
FIG. 2 illustrates an embodiment of a content router of the ICN of FIG. 1.

The routers 106 may collaborate for caching content with one or more other routers 106 in the network, such as an ICN, which may be configured as follows. With reference to FIG. 2, a router 106 may comprise a content store (CS) 210, pending interest table (PIT) 220, and forwarding information base (FIB) 230. The CS 210 may be used (e.g., in a storage or memory unit) to cache (for a relatively short time) or store (for a relatively longer time) content data. The CS 210 may also receive and associate interest messages (including user requests for content) with corresponding content data (the requested content).

The PIT 220 may be any data structure (e.g., a table, list, database) used to record and keep track of the received interest messages that are being served or pending until the corresponding requested content data is received. The interest messages may be associated in the PIT 220 with the next hop(s) (or next hop interfaces or faces) of the collaborative caching router 206 on which the interest messages were received.

The FIB 230 may be any data structure (e.g., a table, list, database) used to associate content or a namespace with corresponding ports or faces (for next hops) on which the interest messages and content data are received and forwarded, subject to the current forwarding policies. The FIB 230 entries may indicate the next hop(s) on which content or data packets may be forwarded. In one embodiment, the FIB 230 may also be a sub-data structure (e.g. a data structure within a data structure), such as a table, list, database which may be maintained and operated (to process content and data) at a data plane or forwarding plane. The data plane may comprise operations for transferring content and data in the ICN 102, and the control plane may comprise operations related to controlling network operations including the data plane operations. In one embodiment, the data structures may be stored and maintained in a storage or memory unit of the router 106.

To carry out the Interest message and Data packet forwarding functions, the router 106 maintains the three data structures described above, namely: (1) a CS 210 acting as a temporary cache of Data packets the router has received, which cached Data packets may be used to satisfy future Interests; (2) a PIT 220 to store the Interest messages (or a subset of Interest messages for which stateful forwarding is enabled) that a router has forwarded but not yet satisfied, where each PIT 220 entry records the data name carried in the Interest message (or a router designated name associated with the Interest message), together with its incoming and outgoing interface(s); and (3) a FIB 230 as a routing/forwarding table which maps name components to interfaces, and is populated by a name-prefix based routing protocol, for example, through a routing information base (RIB) for which the name prefix based routing protocol originates, and can have multiple output interfaces for each prefix. Additionally, the router 106 may include forwarding policies and rules to handle forwarding of packets.

In one example embodiment, when the router 106 receives an Interest packet (incoming interest or message), which includes for example the name of content from a requester, the router 106 first checks to determine if there is a locally cached copy of the content in the CS 210. If a locally cached copy of the content exists in the CS 210, the router 106 can reply to the Interest message by sending the content copy to the incoming face of the Interest message.

If no locally cached copy of the content exists, the content router 106 checks to determine if there are pending interests in the PIT 220 with the same content name. If a request targeting the same content name exists and is pending, then the incoming face of the new Interest message is added to the face list for the content name in the PIT 220. Accordingly, the new interest message is no longer required to be forwarded.

Otherwise, the router 106 forwards the Interest message by performing a lookup, such as a longest-prefix matching based lookup, in the FIB 230 based on the content name. The Interest message is then stored in the PIT 220 by creating a new entry. If no matched entry is maintained in the FIB 230, then the Interest message is either dropped or forwarded to a face(s) other than the incoming face, depending on the forwarding strategy implemented by the receiving router 106.

The network environment 100 may further include content or data store(s) 108, which may store the content or collections of content, such as files, images, videos, and the like. The managers 104 and the routers 106 may communicate with the data store(s) 108 to provide the content to different users. Additionally, the network environment 100 may include one or more user devices 103, including for example and without limitation, desktop computers, handheld devices, laptops or other portable computers, network computers, mobile phones, landline phones, and the like.

Figure 3:
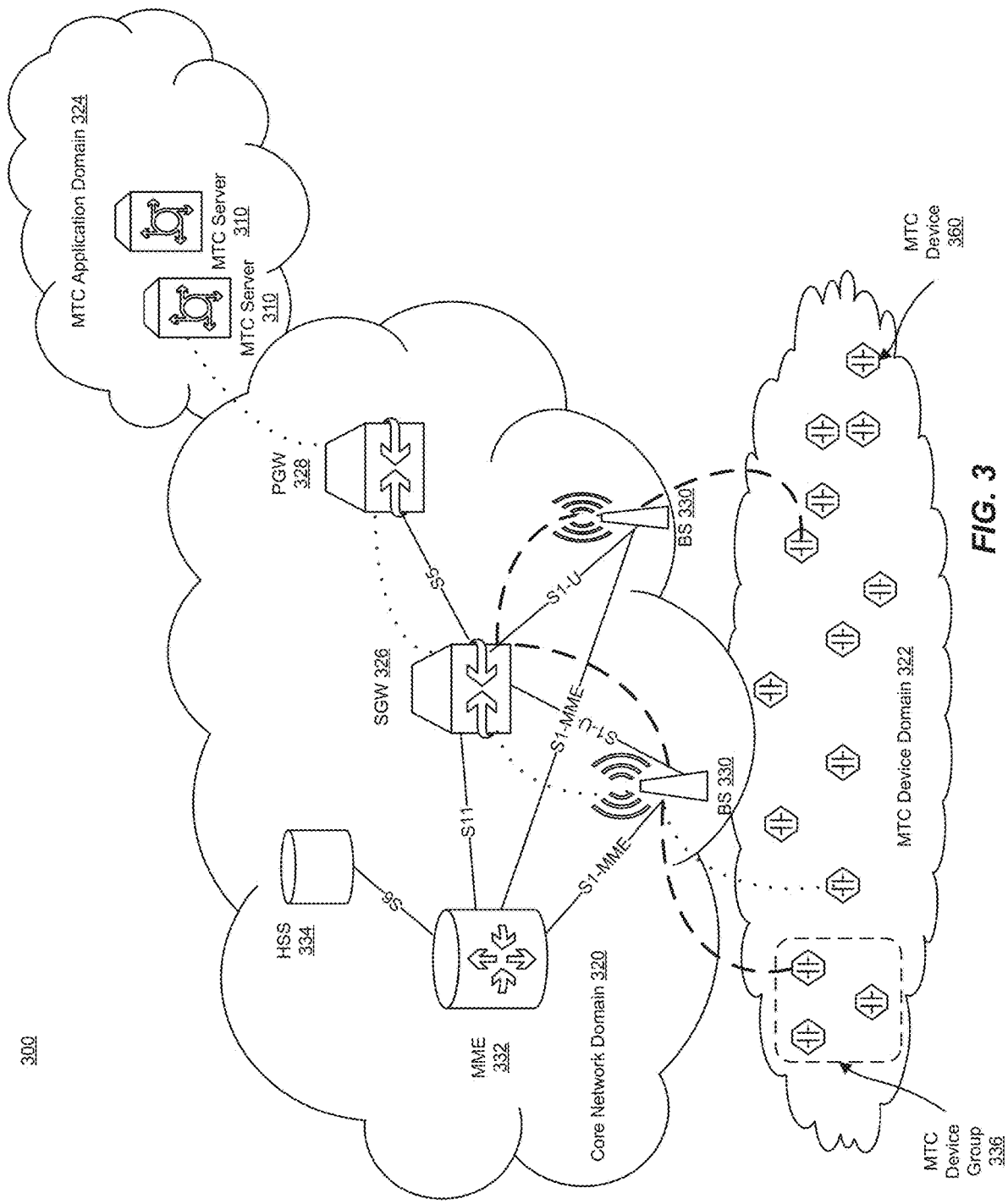
FIG. 3 illustrates a Machine Type Communication (MTC) network.

FIG. 3 illustrates a machine type communication network. MTC is a form of data communication which involves one or more entities that do not necessarily require human interaction. In the example MTC network 300, there are three domains—the core network domain 320, the MTC device domain 322, and the MTC application domain 324.

The core network 320 may include a mobility management entity gateway (MME) 332 attached to a home subscriber server (HSS) 334 (via an S6 interface), a Serving Gateway (SGW) 326, a packet data network (PDN) gateway (PGW) 328 and base stations (BSs) 330. The core network 320 may also facilitate communications with other networks (not shown).

While each of the foregoing elements are depicted as part of the core network 320, it will be appreciated that any one of these elements may be owned and/or operated by an entity other than the core network operator.

In the core network 320, the base stations (BSs) 330 perform many functions including radio resource management, admission control, scheduling, etc. A base station (BS) 330 may also be referred to as an access point, a Node B, an eNodeB, gNodeB or some other terminology, and may be in wireless communication with one or more wireless devices, such as MTC devices 360.

The MME 332 may be connected to each of the base stations (BSs) 330, for example via an S1 interface (e.g., an S1-MME interface delivering signaling protocols between the eNodeB and the MME), and may serve as a control node. For example, the MME 332 may be responsible for authenticating MTC devices 360, bearer activation/deactivation, selecting a particular serving gateway during an initial attach of the MTC devices 360, and the like. The MME 332 may also provide a control plane function for switching between other the radio access networks (not shown) that employ other radio technologies, such as GSM or WCDMA.

The SGW 326 may be connected to each of the base stations 330, for example, via an S1 interface (e.g., S1-U delivering data between eNodeB and SGW). The SGW 326 may generally route and forward user data packets to/from the MTC devices 360. The SGW 326 may also perform other functions, such as anchoring user planes during inter-base station handovers, triggering paging when downlink data is available for the MTC devices 360, managing and storing contexts of the MTC devices 360, etc. An S11 interface may also be employed between the SGW 326 and MME 332.

The PGW 328 provides connectivity to the MTC Devices 360 in the MTC device domain 322 to external packet data networks by being the point of exit and entry of traffic for the MTC Devices 330. An S5 interface (e.g., interface between the S-GW and P-GW) may be employed between the PGW 328 and SGW 326.

In the MTC application domain 324, the MTC servers 310 provide services to the MTC application users, typically under the control of the mobile network operator.

The MTC device domain 322 includes the MTC devices 360, which may be individual devices or placed into one or more device groups, such as MTC device group 336. The MTC devices 360 may communicate with zero, one or multiple base stations (BSs) 330 on a downlink and/or uplink at any given moment. The downlink refers to the communication link from a base station (BS) 330 to a wireless device, such as a MTC device 360, and the uplink refers to the communication link from a MTC device 360 to a base station (BS) 330. The communication link may be established using a single-input and single-output (SISO), multiple-input and single-output (MISO) or a multiple-input and multiple-output (MIMO) system. A MIMO system may include both a transmitter and a receiver equipped with multiple transmit and receive antennas.

A MTC device 360 is similar to a wireless communication device, such as a cellular phone, a smart phone, a laptop, a personal digital assistant (PDA), a wireless modem, etc. However, the primary function of the MTC device 360 does not typically provide a user interface. Rather, a MTC device 360 may use the physical (PHY) layer, medium access control (MAC) layer, radio link control (RLC) layer, the Packet Data Convergence Protocol (PDCP) and/or the Radio Resource Control (RRC) layer to establish a communication link with a base station (BS) 330 and the core network 320. Additionally, the MTC device 360 may operate as a network access point between machines (i.e., between data acquisition and data aggregation devices). Non-limiting examples of MTC devices 360 include surveillance equipment, utility measurement devices, fleet management devices and production chain monitoring devices.

In the figure, two examples of MTC communication are illustrated. In a first example, the MTC devices 360 communicating with one or more MTC servers 310 (represented by dotted lines) adopt a client/server model. A client/server model is typical of many MTC applications, such as health monitoring at home or in a hospital, power/gas/water metering, wild field monitoring, etc. In a second example, the MTC devices 360 communicating with each other (represented by dashed lines) adopt an alternative model of communication, i.e. a device to device model. Inter-MTC device communications can be either in an ad-hoc mode or via the mobile network.

Figure 4:
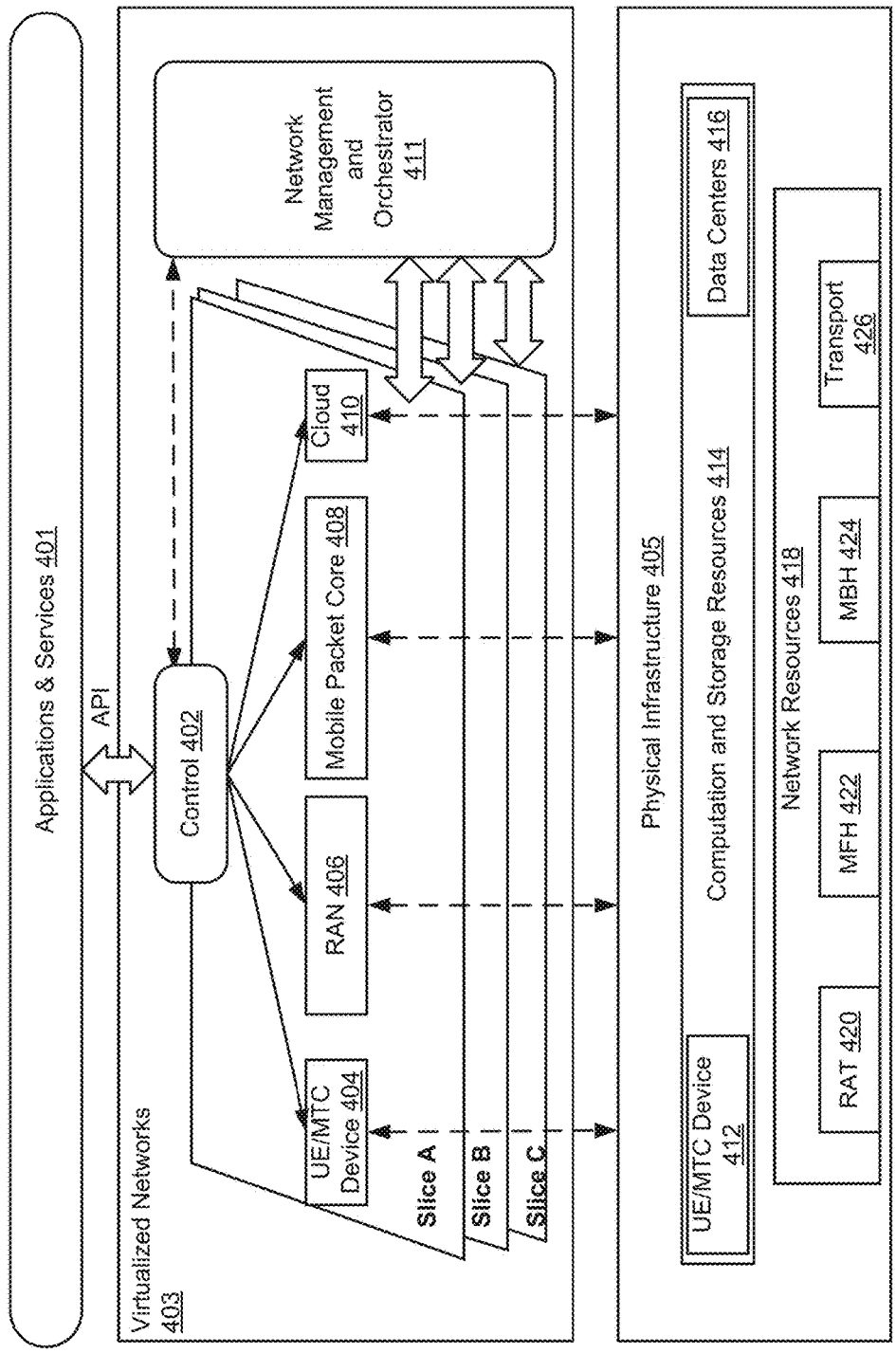
FIG. 4 illustrates a network softwarization and programmability framework.

FIG. 4 illustrates a network softwarization and programmability framework. The network 400 includes, for example, applications and services 402, virtualized networks (or platform) 403 and physical infrastructure 405.

Applications and services plane 401 defines and implements the business processes of the services along specific value chains. A service within the context of 5G is software that performs one or more functions, provides one or more APIs to applications or other services of the same or different planes to make usage of those functions, and returns one or more results. In one embodiment, services can be combined with other services. An application in 5G is software that utilizes the underlying services to perform a function. Examples of applications and services 401 include a variety of different applications or services, such as machine-to-machine (M2M) or Internet of Things (IoT) devices, content delivery, etc. The application and services 401 typically have a wide range of varying requirements which are to be met by the network. In one embodiment, the applications and services 401 are interfaced using an application programming interface (API) with virtualized networks 403 via a control 402.

Control 402 (or slice control) is responsible for instructing network devices, network elements and network functions with respect to processing elementary data units (packets, frames, symbols, bits, etc.) of the user/data/forwarding plane. The control of virtual network functions include control of network softwarization functions, control of orchestration functions, control of mobility control functions, cloud control functions, mobile edge computing control functions and adaptors to different enforcement functions.

The virtualized networks 403 may include, for example, a radio access network (RAN) 406, a mobile packet core 408, and other components such as UE or MTC devices 402 and cloud 410. Each of these elements may be individually or collectively referred to as a resource(s) within the concept of network softwarization. In one embodiment, the virtualized networks 403 may be managed by network management and orchestrator 411. The role of the network management and orchestrator 411 is to build complex network functions and services from less complex/primitive network functions. During this process, the orchestrator considers application and service specific requirements, such as latency, physical locations of specialized hardware, etc. Additionally, the network management and orchestrator 422 analyzed network situations in real time, diagnoses and predicts existing or emerging network issues, and determines and coordinates reactive or proactive actions to resolve any issues. Orchestration activities may include, but are not limited to, service orchestration, service- and network function-specific orchestration algorithms, resource orchestration, implementation of network and service management, and uniform management enablers.

The control 402, by virtue of network softwarization, provides "slicing" such that the emerging network architectures may be realized within individual "slices" of the existing infrastructure. A slice is a collection of virtual or physical network functions connected by links to create an end-to-end networked system, which may additionally include edge and central data center resources to provide differentiated connectivity behaviors to fulfill requirements of distinct services, applications and customers. As defined in ITU-T Y.3011, ITU-T Y.3012, slicing allows logically isolated network partitions with a slice (e.g., slice A, B or C) being considered as a unit of programmable resources such as network, computation and storage. In 3GPP systems a network slice is a complete logical network which provides telecommunication services and network capabilities. Distinct RAN 406 network slices and mobile packet core 408 network slices will interwork with each other to provide mobile connectivity. A device may access multiple network slices simultaneously through a single RAN 406. For example, an ICN 400 is a type of emerging network architecture that may be realized as one slice in the network, which resides on a slice of the physical infrastructure. When employing an ICN as a slice, the nodes in the core network (e.g. eNodeB, SGW, PGW) may inherit the fundamentals of the ICN. That is, the nodes may be integrated with the naming, name-based routing, in-network processing and caching as part of their functionality.

Physical infrastructure 405 comprises both the radio access network and an interconnection to the core network functions where the functions are deployed at distributed or centralized nodes in the fixed network. To deploy these functions, the fixe network encompasses several aggregation nodes in which computing and storage capabilities can be installed. These capabilities may be used flexible for efficient operation of the mobile network. In the depicted embodiment, the physical infrastructure 405 includes computation and storage resources 414 (such as UE and MTC device(s) 412) and data centers 416, and network resources 418 (such as radio access technologies (RAT) 420, mobile fronthaul (MFH) 422, mobile backhaul (MBH) 424 and transport 426). It is appreciated that the physical infrastructure 405 is not limited to the disclosed embodiments, and that any number of physical networks and devices may be employed.

FIG. 5A is an example use scenario of employing an MTC network architecture. Machine type communications relate to enabling direct communications among electronic devices and/or enabling communications from MTC devices, such as MTC devices 360, to a central MTC server or set of MTC servers 310 (FIG. 3). As appreciated, MTC will enable any number of applications in a variety of domains, as well as connect numerous MTC devices 360 to the Internet and other networks, which may form the Internet-of-Things (IoT).

As illustrated in the depicted embodiment, MTC devices 360 are deployed in the MTC device domain 322. The MTC devices 360, as described above, may be one of numerous types of devices. In the example of FIG. 5A, MTC devices 360 are deployed in a cropland or farm for measuring and sensing temperature, water level, snow level, animal intrusion, etc. The MTC devices 360 may connect, for example, through one or more base stations 330 to the core network 320 (described above with reference to FIG. 3), and may be accessed by MTC applications through MTC application domain 324. It is appreciated that for any specific type of service to be performed by an MTC device 360 (e.g., temperature measurement, water level measurement, snow level measure, animal intrusion detection) in an area, multiple MTC devices 360 may be deployed to provide the measurement and sensing of content information. For example, if a user is measuring the temperature on the cropland (MTC device domain 322), multiple MTC devices 360 (i.e., a group of MTC devices 336) may be deployed to measure temperature.

In the MTC network architecture 300 (FIG. 3), a particular MTC application in the MTC application domain 324 may obtain data from any of the MTC devices 360 deployed in the field. The MTC application is not concerned with any one MTC device 360 that is responsible for returning data. Given this paradigm, an anycast communication address and routing method may be utilized. (It is appreciated that while anycast may be employed in one embodiment, other forms of communication may also be employed). Anycast is a network addressing and routing method in which packets may be communicated between a single sender (client) and the "nearest" or "lowest cost" or "healthiest" destination node or server (any one of several destinations) identified by the anycast address. For example, when a client wants to send packets to any one of several possible destination servers offering a particular service or application, any number of destination servers can be assigned a single anycast address within an anycast group. A client sends packets to an anycast server by placing the anycast address in the packet header, and routers deliver the packet to the destination server with the matching anycast address.

While anycast provides a valuable communication mechanism, nodes in the core network 320 lack the support mechanisms for anycast communication. Without the anycast communication support in the core network 320, the core network 320 relies on the MTC server(s) 310 to provide the anycast support at the application layer. This requires the MTC server(s) 310 to constantly request the MTC device's 360 status in order to determine which of the MTC devices 360 may retrieve the requested data. This process ends up generating unwanted extra traffic in the core network 320 and MTC application network 324, as well as generating additional signaling overhead in the core network 320.

With reference to FIG. 5B, an example of an information centric approach to support the anycast service for MTC in the core network is illustrated. Continuing with the cropland example in FIG. 5A, each of the MTC devices 360 covers a specified one or more areas 1-21 (which areas may overlap, although not depicted as such in the figure). While the depicted embodiment shows areas 1-21 as evenly distributed throughout the cropland, it is appreciated that the areas 1-21 may be distributed randomly or distributed in any number of different ways. Additionally, the areas 1-21 may be in a variety of shapes and sizes in order to cover a specified area or region.

For each of the areas 1-21, one or more MTC devices 360 may be deployed. In one embodiment, MTC devices 360 having the same or similar measuring and/or sensing function (e.g., temperature sensing, water level sensing, snow level sensing, animal intrusion detection, etc.) are mapped or deployed in a same area. For example, area 1 may deploy multiple MTC devices 360 (together, MTC device group 336A) that measure temperature.

In one other embodiment, multiple MTC devices 360 that are deployed in a same area (and have the same or similar type or functionality) can together form a group of devices (e.g., MTC device group 336). It is appreciated that the group may comprise all or a portion of the multiple MTC devices 360 within the area. Similarly, MTC device group 336 may be formed from different areas 1-21, where the multiple MTC devices 360 in the different areas have the same or similarly type or functionality. For example, MTC devices 360 may be deployed in areas 15 and 16 and together form MTC device group 336B.

In still one other embodiment, each MTC device group 336 that is formed may be deemed an anycast group, in which each of the MTC devices 360 can reply to a MTC application's data request or subscription and notification request as a group. These anycast groups, may employ a naming scheme, which is globally unique and can facilitate the discovery of the anycast group. In order to employ such a naming scheme, the name of an anycast group may include one or more of the following fields:

Type: The type identifies the sensing function or capability of the MTC devices 360 included in the anycast group (e.g., MTC device group 336). An MTC device 360 may have multiple sensing functions, thus it may be included in the multiple anycast group.

Main Location: The main location indicates the main location of the MTC devices 360 included in the MTC device group 336. The location is unique globally, which can be represented, for example, by the latitude and longitude coordinate, descriptive address, etc.

Specific Area: The specific area gives the area in the main location in which the MTC devices 360 in the MTC device group 336 covers. Such specific area may be initially labeled by the administrator or owner of the location (in this case, cropland).

FIG. 6 is an example sequence diagram of an MTC device joining an anycast group. The MTC device operator (which in one example embodiment may be the same entity as the administrator of the sensing location) is aware of the deployed MTC devices 360 and the information that is needed to formulate the anycast group. Such information may include, but is not limited to, type, major location, specific area, etc. The MTC device operator may program each of the MTC devices 360 in the anycast group.

When the MTC device 360 is bootstrapped and connected to the base station 330 at 602, the base station 330 is notified and stores the information. The base station 330 manages and maintains each anycast group of records based on the information from the attached MTC device 360 at 604 (described further below), and the MTC device 360 receives confirmation that the MTC device 360 has been added to the anycast group stored at the base station 330 at 606.

FIG. 7 illustrates a base station management of an anycast group when receiving information from a newly attached MTC device. When a new MTC device 360 attaches to the network, the associated base station 330 (FIG. 3) receives information (e.g., type, major location, specific area) from the MTC device 360 at 702. Based on the received information, the base station 330 determines whether an existing and matching anycast group has been previously recorded (e.g., recorded in an entry of a table stored in memory) at 704. For example, table 800 illustrates a table that stores MTC device member of a particular anycast group, as described further below. If the base station 330 determines that a matching record exists (e.g., information or attributes of the newly attached MTC device match the information or attributes of the exiting anycast group), the newly attached MTC device 360 is added as a member to the existing anycast group at 708. Otherwise, if the base station 330 determines that the newly attached MTC device 360 is not part of an existing anycast group, then a new anycast group may be created at 710 (or alternatively the information may be discarded). In one embodiment, the anycast name of the newly created anycast group is formulated from the information sent from the MTC device 360 to the base station 330.

With reference to FIG. 8, the base station 330 maintains the anycast group records as shown in table 800. Table 800 contains a globally unique name of the base station 330, the members (MTC devices 360) in the anycast group, and any information or attribute that could be obtainable by the base station 330 about members of the anycast group. For example, a sleeping schedule of an anycast member may be obtained by the base station 330 using the received keep-alive messages from a MTC device 360 in the anycast group. The sensing signaling strength, sensing accuracy and remaining power may also be provided by the MTC device 360 as extra information sent to the base station 330. It should also be appreciated that although the anycast group is depicted as being stored in a table of memory, any number of different storage techniques may be applied. For example, any data structure may be used to record entries of the anycast group.

Figure 9:
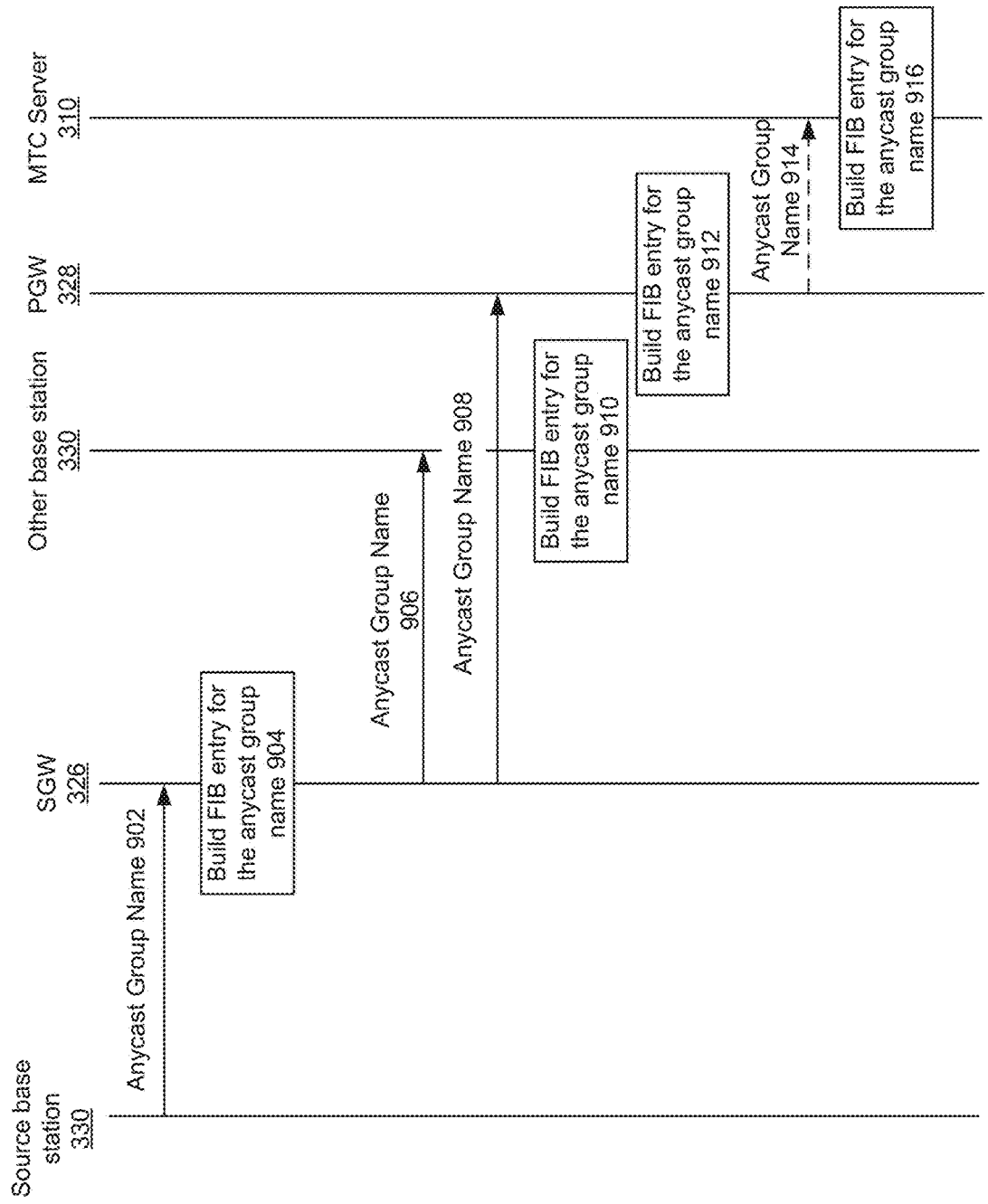
FIG. 9 illustrates a sequence diagram for publication of an anycast group.

FIG. 9 illustrates a sequence diagram for publication of an anycast group. After a source base station 330 (i.e., the base station receiving information from one or more MTC devices or an MTC device group) creates an anycast group, the anycast group name is forwarded to the SGW 326 (FIG. 3) at 902, where the SGW 326 adds a new entry in the FIB with the name set to be the anycast group name. Instead of maintaining the forwarding face, the FIB maintains the address of the next hop towards the anycast. The base station 330 sets the next hop to itself and publishes the anycast group in the core network 320 and the MTC application network 324 (FIG. 3).

In one embodiment, the publication message sent at 902 to the attached SGW 326 may also include one or more unpublished anycast groups. The SGW 326 will add the entry in the FIB for the anycast group name and set the next hop to the base station 330 at 904. The SGW 326 will then perform a publication procedure 906 and 908, similar to the publication message sent from the base station 330, to each of its attached nodes (e.g., other base station(s) 330, other than the source base station 330 responsible for publication at 902, and the attached PGW 328). The other base station(s) 330 and PGW 328 will also add the entry of the anycast group name and set the next hop at 910 and 912, respectively. The PGW 328 can similarly publish the anycast group name to the MTC server(s) 310 in the MTC application network 328 at 914 through, for example, edge routers connecting the core network 320 and the MTC application network 328 (FIG. 3).

Figure 10:
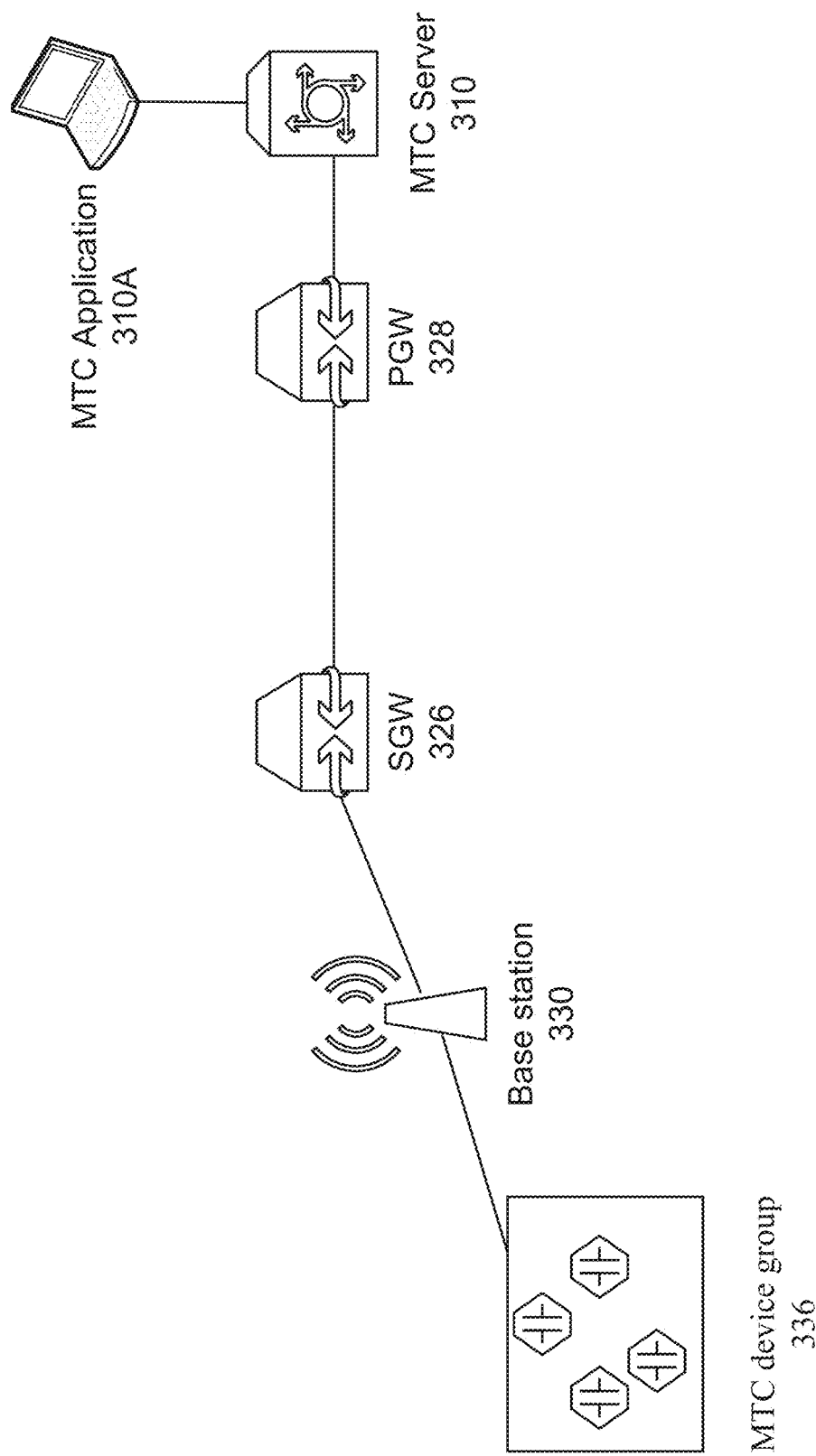
FIGS. 10 and 11 illustrate an MTC server initiated anycast request network and message flow.
Figure 11:
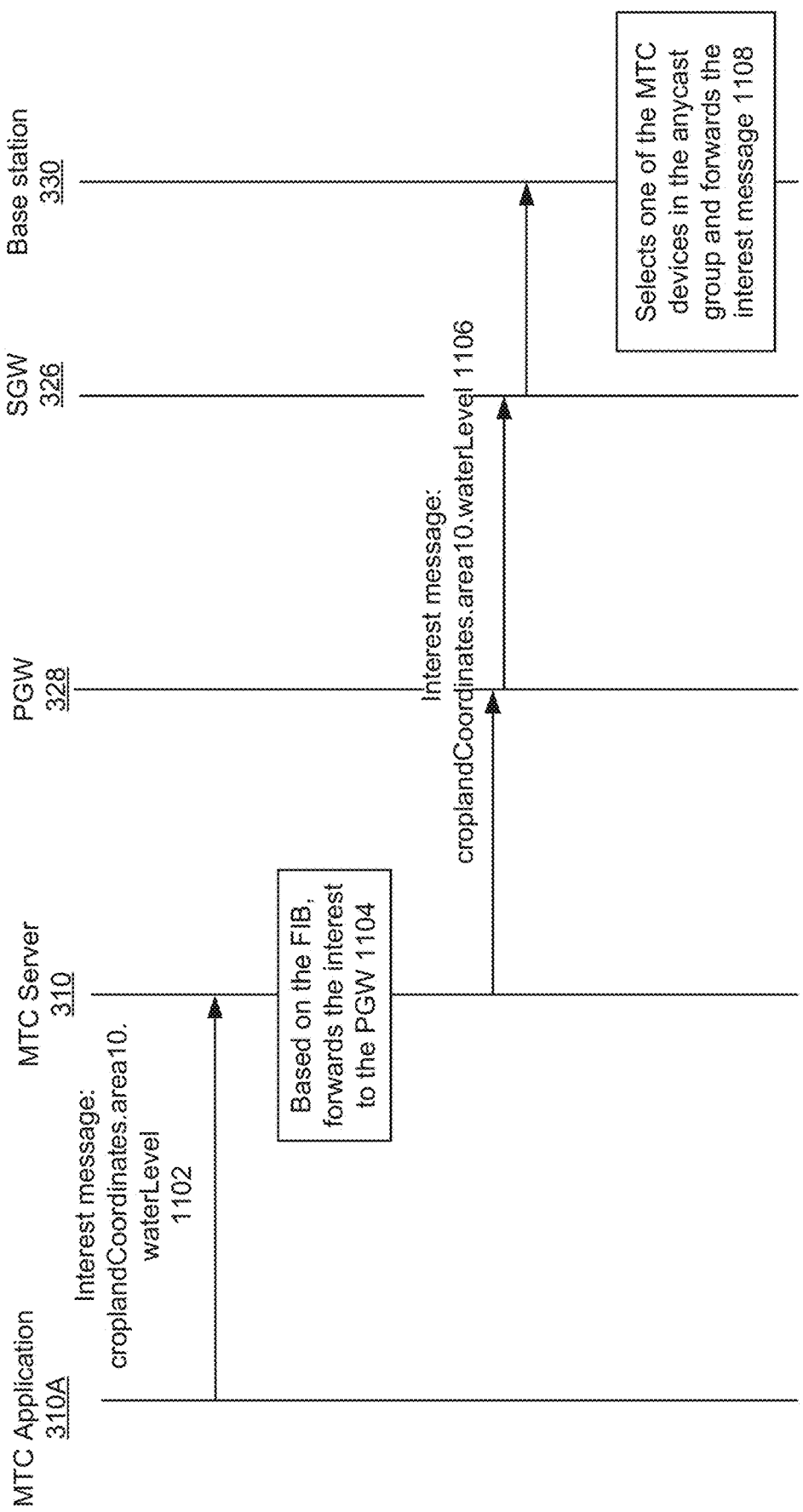

FIGS. 10 and 11 illustrate an example MTC server initiated anycast request network and sequence diagram. In particular, FIG. 10 illustrates an example MTC server initiated anycast request, in which the MTC server 310 requests communication with MTC device 360. In the depicted example, the network includes a group of MTC device group 336 (anycast group), base station 330, SGW 326, PGW 328, MTC server 310 and MTC application 310A. It is appreciated that the depicted network is simplistic for purposes of discussion, but may include any number of components similar to the networks in FIGS. 1 and 2.

Operational flow of the network in FIG. 10 is discussed with reference to FIG. 11. The MTC application 310A sends an interest message with the content name included at 1102. In the disclosed embodiment, the content name is set to be the anycast group name "croplandCoordinates.area10.waterLevel."

The interest message is forwarded from the MTC application 310A to MTC server 310, and, based on an entry in the FIB of the MTC server 310 that corresponds to the anycast group name at 1104, the interest message is forwarded to each intermediate node MTC server 310, PGW 328 and SGW 326 until reaching the base station 330. The base station, as described above, is the source of the anycast group creation and publication.

Upon the interest message reaching the base station 330, the base station 330 determines whether the anycast group name in the interest message exists and matches an anycast name stored in memory, as discussed above. If a matching anycast group record is found in memory, the base station 330 determines which of the MTC devices 360 are members of the MTC device group 336, as well as the information and attributes of each member in the MTC device group 336 that may assist the base station 330 in making decisions.

In one embodiment, the base station 330 may enhance processing by excluding MTC devices 360 in the MTC device group 336. For example, one or more MTC devices 360 may be unavailable or in 'sleeping mode.' In this case, the base station 330 may exclude the unavailable MTC device(s) 360 in an effort to reduce any extra signaling overhead. Moreover, for non-excluded MTC devices 360 of the MTC device group 336, the base station 330 may select one or more MTC device(s) 360 with the highest sensing accuracy, the strongest sensing strength and/or the largest remaining power. After the MTC device 360 is selected, the interest message is forwarded to the selected MTC device 360. The MTC device 360 may then reply to the interest message with the sensed or measured data and return the data to the MTC application 310A in a response message (e.g., data packet), for example, traversing a reverse path of the interest message.

Figure 12:
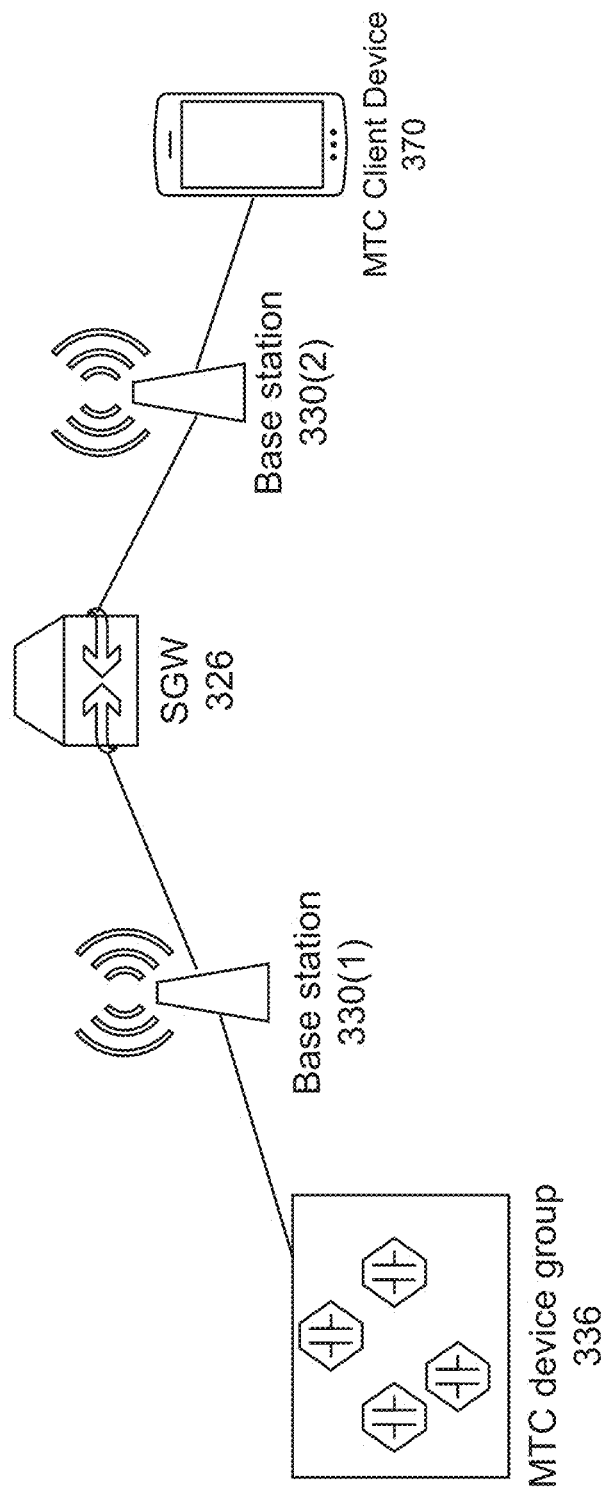
FIGS. 12 and 13 illustrate an example MTC device initiated anycast request network and sequence diagram.
Figure 13:
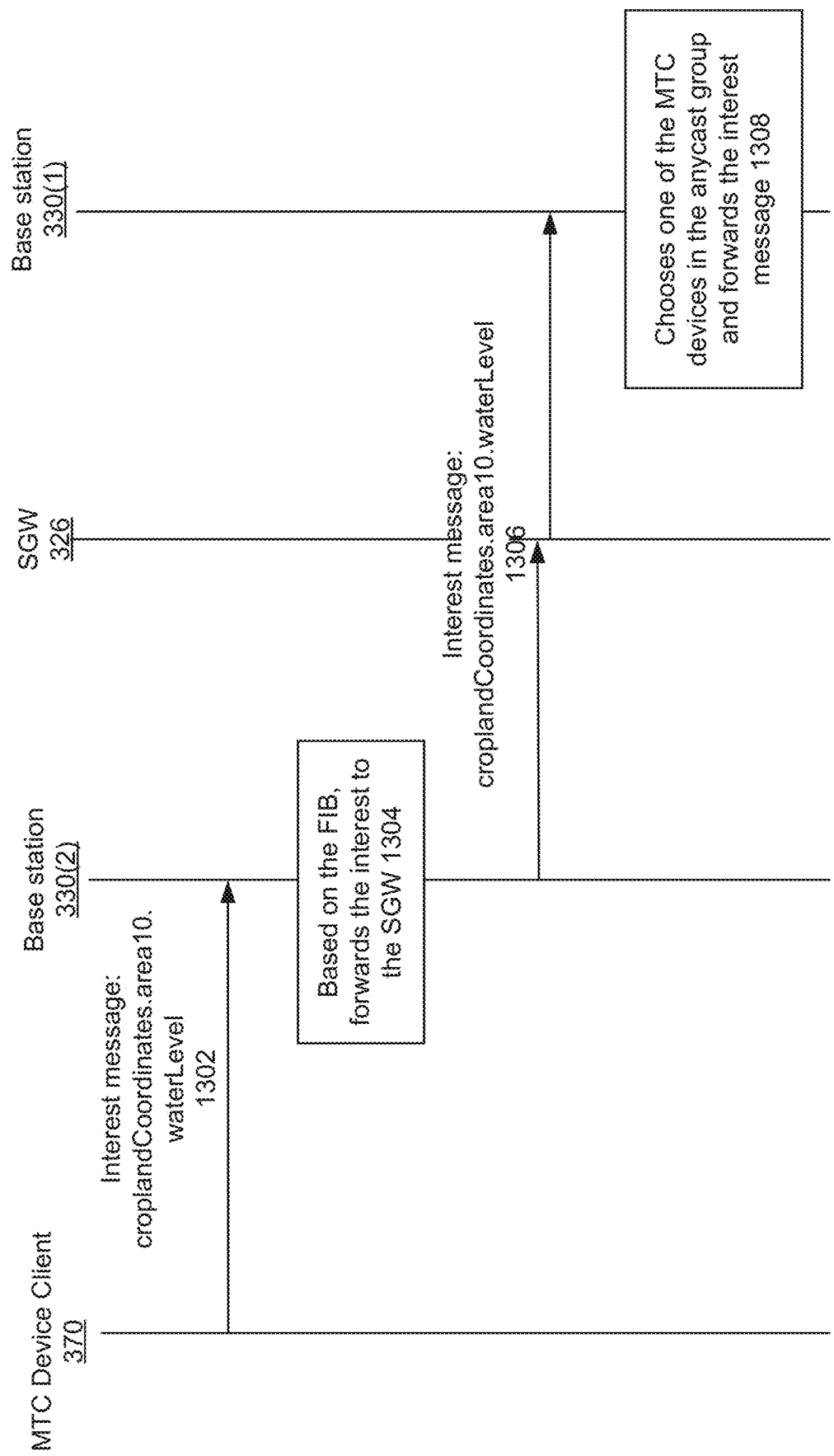

FIGS. 12 and 13 illustrate an example MTC device initiated anycast request network and sequence diagram. As depicted, the MTC device 360 initiated anycast request represents an MTC device-to-MTC device communication. The network disclosed in FIG. 12 includes an MTC device group 336 (anycast group), base station 330(1), SGW 326, base station 330(2) and MTC client device 370. The MTC client device 370 may be any wireless communication device requiring an interface for human interaction, as described above, and is separate from the MTC device(s) 360. In one embodiment, the MTC client device 370 may be exchanged or replaced with a MTC device 360.

With reference to FIG. 13, the MTC device client 370 sends an interest message with the content name included, where the content name is "croplandCoordinates.area10.waterLevel." The interest message is forwarded by the MTC device client 370 at 1302 based on the entry corresponding to the MTC device group name in the FIB of each intermediate node (e.g., forwarded to base station 303(2) and SGW 326) at 1304, until the interest message reaches base station 330(1), via forwarded interest message from SGW 326 at 1306. Base station 3301(1) is the source of the MTC device group 336 creation and publication, as described above.

Once the interest message is received at the base station 330(1), the base station 330(1) will follow the same mechanism to select the MTC device 360 of the MTC device group 336 to forward the interest message, as described in the prior example, at 1308. The MTC device 360 may then reply to the interest message with the sensed or measured data and return the data to the MTC application 310A in a response message (e.g., data packet), for example, traversing a reverse path of the interest message. Performance Analysis and Evaluation Embodiments of the disclosed information centric approach to provide an anycast communication is compared with a conventional application level anycast that is provided by the MTC server 310. The application level anycast provided by the MTC server 310 differs from the disclosed information centric approach in at least the following aspects:

(1) The MTC server 310 maintains all of the information about the anycast group and the member (group) MTC devices. The MTC server 310 requires each MTC device 360 to register respective context information (i.e. attributes, such as signal strength, accuracy, left power, etc.). Additionally, the MTC server 310 requires the MTC device 360 to periodically update the context information as it changes over time (e.g., remaining power). As a result, the MTC server 310 generates frequent control message and signaling overhead to the core network.

(2) All of the anycast communications, either between the MTC server 310 and an MTC device 360 or between an MTC device 360 and another MTC device 360, is processed by the MTC server 310. For example, in a communication between an MTC device 360 and another MTC device 360, the anycast request message is first forwarded to the MTC server 310. The MTC server 310 makes a decision on which MTC device 360 will be in charge of replying to the request message. Subsequently, the MTC server 310 forwards the request message to the chosen MTC device 360. In contrast, in the disclosed information centric approach, nodes in the core network can provide the anycast communication support without the request message being processed by the MTC server 310. Rather, the MTC server 310 achieves direct communication between the MTC devices 360 within the core network and reduces overall latency.

Control Message Overhead Comparison

The control message overhead in the application level anycast approach for the above examples include the MTC device group 336 registration and MTC device 360 information for each member in the MTC device group 336, as well as periodic updates of the MTC devices 360 dynamic context information to the MTC server 310. The control message overhead in the disclosed information centric approach, on the other hand, includes the MTC device group 336 creation and publication, as well as periodic updates of member (group) MTC devices dynamic context information to the attached base station 330.

In FIG. 14, table 1400 shows variables and corresponding values applied during set up to measure performance.

A member device (of an anycast group) registration message in the application level anycast approach includes each registering device's contextual information, which needs to be forwarded to the MTC server 310. For purposes of the performance evaluation example, a relatively large value for the size is chosen given the message may contain multiple attributes of the member device. With reference to the table 1400, the registration overhead in the application level anycast approach depends on the size of the member device registration message, the number of member devices in the anycast group, and the number of network hops from the base station 330 that the devices are attached to the MTC server 310.

In the disclosed information centric approach, on the other hand, the member device registration message reaches the mobile edge node (i.e., base station 330), not the MTC server 310. The base station 330 will send the anycast group propagation message in the core network 320 until it reaches the MTC server 310. The registration overhead in the disclosed information centric approach is determined by the size of the anycast group propagation message, the number of base stations considered in the evaluation and the number of network hops from the base station 330 that the devices are attached to the MTC server 310.

Figure 15:
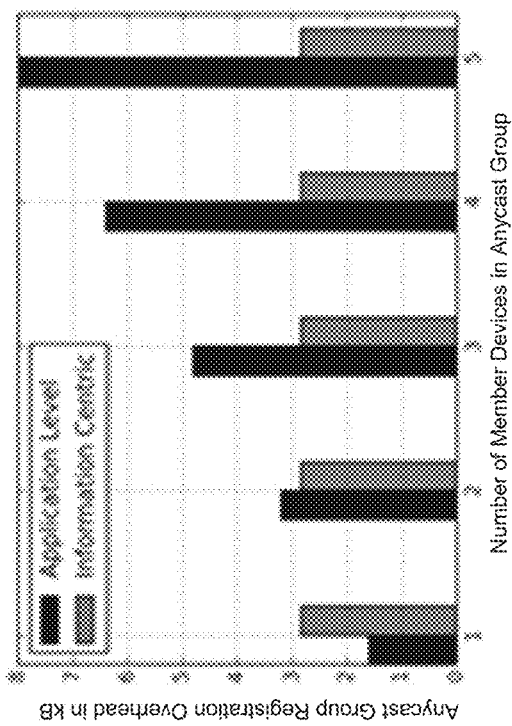
FIG. 15 illustrates a graph comparing an anycast group registration overhead in an application level and information centric methodologies.

FIG. 15 illustrates a graph comparing the anycast group registration overhead in the application level anycast approach and information centric approach. When a single MTC device 360 is in the anycast group (typically not the case), the information centric approach generates more registration overhead than the application level approach, as shown in the leftmost column of the figure (where the application level generates less overhead than the information centric approach). However, when there are two or more MTC devices 360 in the anycast group, the information centric approach starts to show significantly less registration overhead than the application level approach, as shown in the columns except the leftmost column. The gap between the two approaches increases as the number of MTC devices 360 in the anycast group increases. Notably, in the information centric approach, the same registration overhead is maintained no matter how many member devices are in the anycast group.

When updating overhead, the application level approach is demonstrates overhead that is more severe than information centric approach. The difference in overhead is a result of the number of hops that the MTC devices 360 information update messages traverse in the core network 320 and MTC application domain 324. In the disclosed information centric approach, the update message is sent to the base station 330 at the mobile edge, and is not forwarded further. In the application level anycast approach, on the other hand, the update message is forwarded to the MTC server 310 and requires frequent signaling in the core network 320 (e.g. between the base station and SGW, and the SGW and PGW), resulting in increased overhead.

Figure 16:
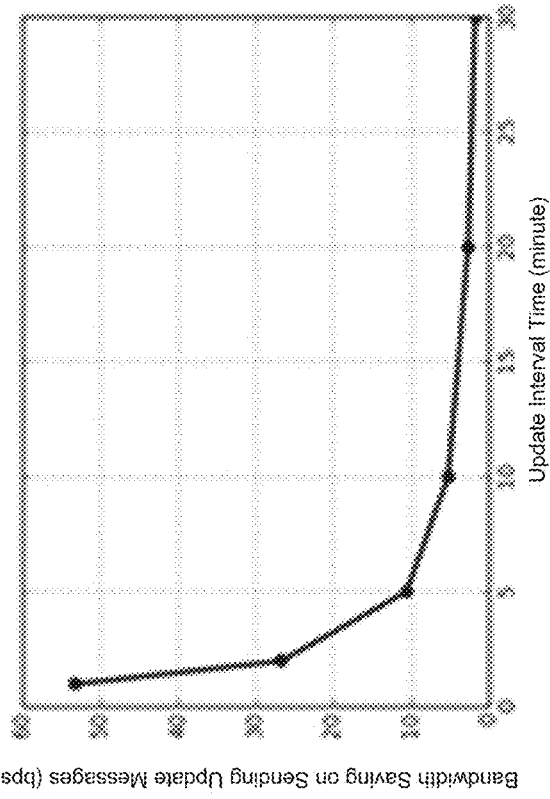
FIG. 16 illustrates bandwidth savings when transmitting update messages in an information centric approach compared to an application level approach.

FIG. 16 illustrates bandwidth savings when transmitting update messages in the information centric approach compared to the application level approach. As illustrated, the bandwidth saving is larger when the update frequency is low. The smaller update interval time means that the update message is sent more frequently, and thus more update messages in a fixed time of period. Consequently, the bandwidth saving is more dramatic when the update interval time is smaller.

Overall Latency Comparison

Figure 17:
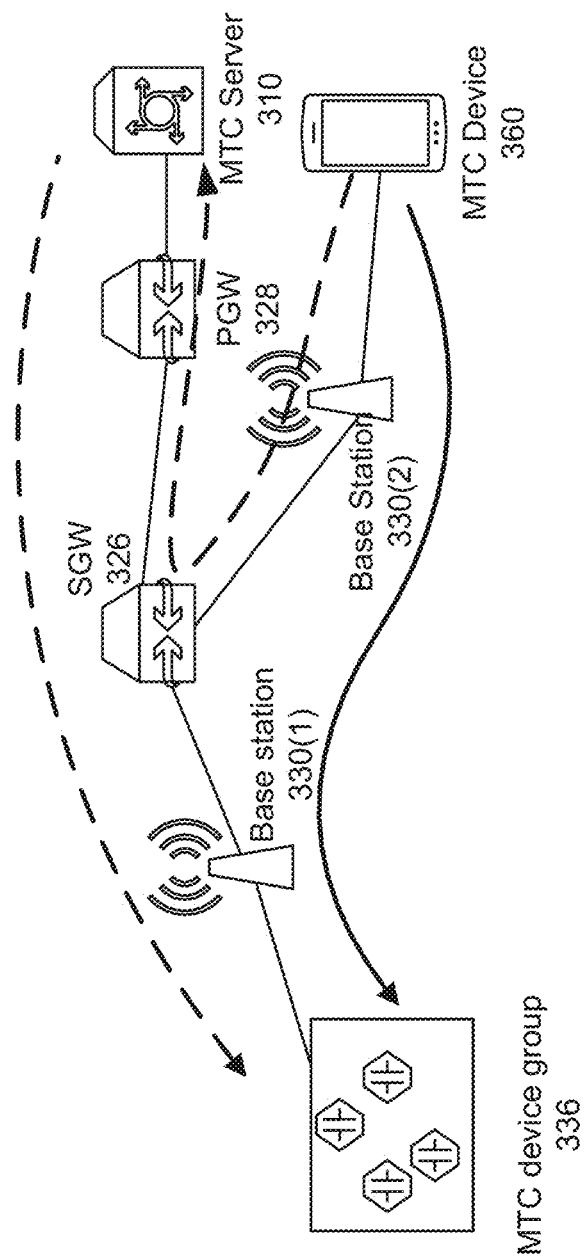
FIG. 17 shows interest message flowing directions of an information centric approach and an application level anycast approach.

FIG. 17 shows interest message flowing directions of the disclosed information centric approach and the application level anycast approach. In particular, the overall latency is analyzed in an example of an MTC device initiated anycast scenario. In the application level anycast approach, the MTC device initiated anycast request is forwarded to the MTC server 310 to be processed, which will choose a MTC device member in the anycast group to reply the request. As illustrated the interest message is traversed in the network with a larger number of hops in the application level anycast approach (represented by dashed arrows) when compared to the disclosed information centric approach (represented by solid arrows). For example, in the depicted embodiment, the application level anycast approach requires 5 hops from the MTC device 360 to the MTC device group 336, whereas the information centric approach requires 3 hops from the MTC device 360 to the MTC device group 336. Similarly, data returned from the MTC device group 336 to the MTC device 360 will traverse a reverse path. As a result, the overall latency experienced by the MTC device 360 can be significantly improved when implementing the disclosed information centric approach.

Figure 18:
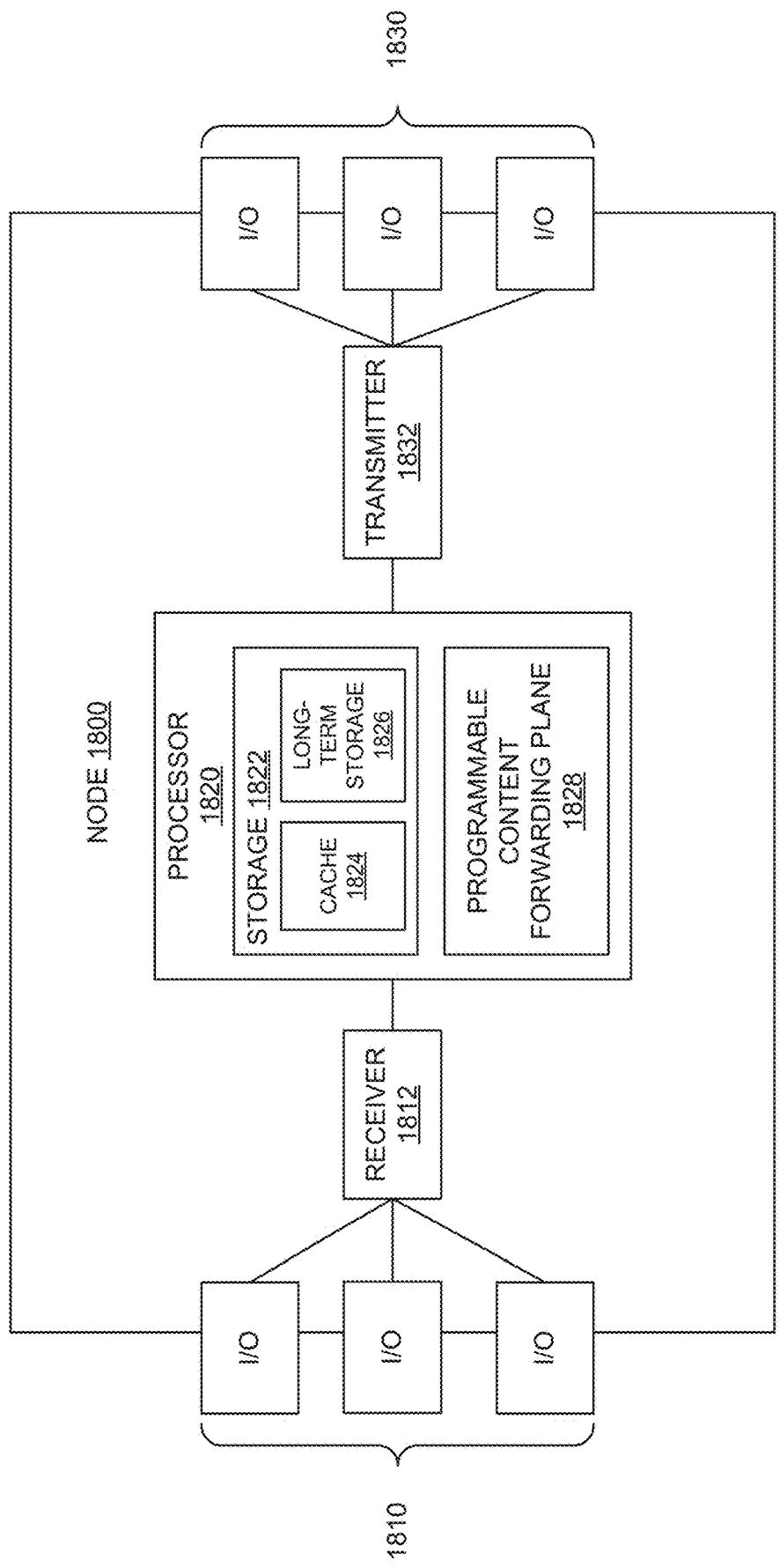
FIG. 18 illustrates an embodiment of a router in accordance with embodiments of FIGS. 1-3, 10 and 12.

FIG. 18 illustrates an embodiment of a router in accordance with embodiments of the disclosure. The node (e.g., a router) 1800 may be, for example, the content router 100 (FIG. 1) or any other node or router as described above in the ICN. The node 1800 may comprise a plurality of input/output ports 1810/1830 and/or receivers (Rx) 1812 and transmitters (Tx) 1832 for receiving and transmitting data from other nodes, a processor 1820 (or content aware unit), including a storage 1822 and programmable content forwarding plane 1828, to process data and determine which node to send the data. The node 1800 may also receive Interest messages and Data messages as described above. Although illustrated as a single processor, the processor 1820 is not so limited and may comprise multiple processors. The processor 1820 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1820 may be configured to implement any of the schemes described herein, such as the processes illustrated in FIGS. 6-9, 11 and 13 using any one or combination of steps described in the embodiments. Moreover, the processor 1820 may be implemented using hardware, software, or both.

The storage 1822 (or memory) may include cache 1824 and long-term storage 1826, and may be configured to store routing tables, forwarding tables, or other tables or information disclosed herein. Although illustrated as a single storage, storage 1822 may be implemented as a combination of read only memory (ROM), random access memory (RAM), or secondary storage (e.g., one or more disk drives or tape drives used for non-volatile storage of data).

The programmable content forwarding plane 1828 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, FIB) at the processor 1820. The programmable content forwarding plane 1828 may interpret user requests for content and accordingly fetch content, e.g., based on metadata and/or content name (prefix), from the network or other content routers and may store the content, e.g., temporarily, in storage 1822. The programmable content forwarding plane 1828 may then forward the cached content to the user. The programmable content forwarding plane 1828 may be implemented using software, hardware, or both and may operate above the IP layer or L2.

Figure 19:
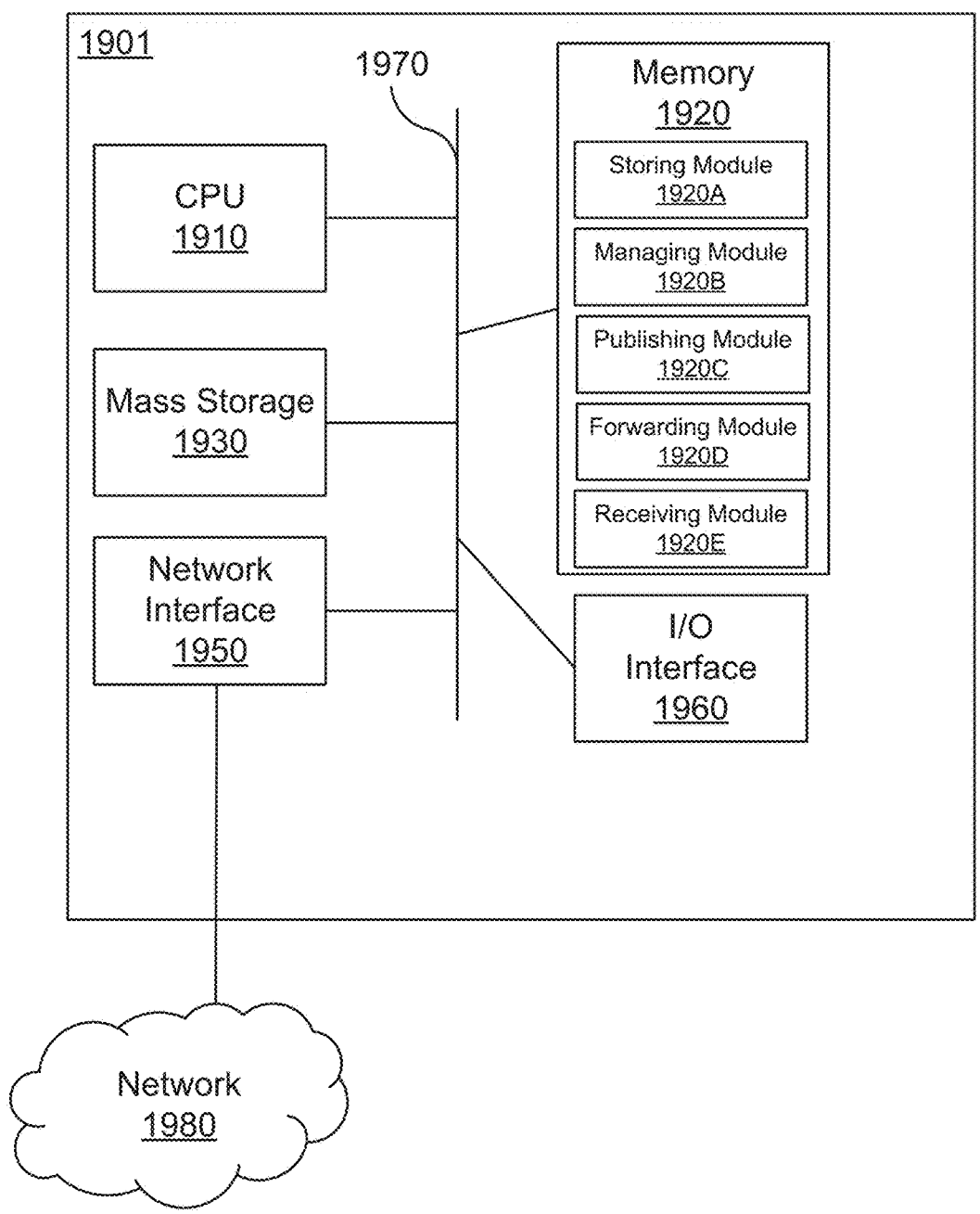
FIG. 19 illustrates a block diagram of a network system that can be used to implement various embodiments.

FIG. 19 is a block diagram of a network device 1900 that can be used to implement various embodiments. Specific network devices may utilize all of the components shown, or only a subset of the components, and levels of integration may vary from device to device. Furthermore, the network device 1900 may contain multiple instances of a component, such as multiple processing units, processors, memories, transmitters, receivers, etc. The network device 1900 may comprise a processing unit 1901 equipped with one or more input/output devices, such as network interfaces, storage interfaces, and the like. The processing unit 1901 may include a central processing unit (CPU) 1910, a memory 1920, a mass storage device 1930, and an I/O interface 1960 connected to a bus 1970. The bus 1970 may be one or more of any type of several bus architectures including a memory bus or memory controller, a peripheral bus or the like.

The CPU 1910 may comprise any type of electronic data processor. The memory 1920 may comprise any type of system memory such as static random access memory (SRAM), dynamic random access memory (DRAM), synchronous DRAM (SDRAM), read-only memory (ROM), a combination thereof, or the like. In an embodiment, the memory 1920 may include ROM for use at boot-up, and DRAM for program and data storage for use while executing programs. In embodiments, the memory 1920 is non-transitory. In one embodiment, the memory 1920 includes a storing module 1920A storing a record identifying multiple MTC devices having one or more of the same functions, the multiple MTC devices forming a group with a unique name, a managing module 19206 managing the group of MTC devices to add one or more other connected MTC devices to the information centric network, the one or more other connected MTC devices having one or more of the same functions as the MTC devices already included in the group, a publishing module 1920C publishing a message in the information centric network, the message including the unique name of the group of MTC devices and an address of a next hop towards the group of MTC devices, a receiving module 1920D receiving an interest message including the record with the unique name of the group, and a forwarding module 1920E forwarding the interest message to one or more of the MTC devices in the group of MTC devices based on the entries in the forwarding table.

The mass storage device 1930 may comprise any type of storage device configured to store data, programs, and other information and to make the data, programs, and other information accessible via the bus 1970. The mass storage device 1930 may comprise, for example, one or more of a solid state drive, hard disk drive, a magnetic disk drive, an optical disk drive, or the like.

The processing unit 1901 also includes one or more network interfaces 1950, which may comprise wired links, such as an Ethernet cable or the like, and/or wireless links to access nodes or one or more networks 1980. The network interface 1950 allows the processing unit 1901 to communicate with remote units via the networks 1980. For example, the network interface 1950 may provide wireless communication via one or more transmitters/transmit antennas and one or more receivers/receive antennas. In an embodiment, the processing unit 1901 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for machine type communication (MTC) in an information centric network, comprising:
   storing, at a base station, a record identifying multiple MTC devices having one or more of the same functions, the multiple MTC devices forming a group with a unique name;
   managing, by the base station, the record based on information received from one or more MTC devices newly connected to the information centric network, the one or more newly connected MTC devices added to the group and having one or more of the same functions as the MTC devices previously included in the group;
   adding, by the base station, one or more entries into a forwarding table, the entries including the unique name of the group of MTC devices associated with an address of a next hop towards the group of MTC devices; and
   publishing, by the base station, a message in the information centric network, the message including the unique name of the group of MTC devices and the associated address of the next hop towards the group of MTC devices.

2. The method of claim 1, further comprising:
   receiving an interest message including the unique name of the group to identify the record;
   matching the group of MTC devices corresponding to the unique name in the interest message with the one or more entries in the forwarding table;
   forwarding the interest message to one or more of the MTC devices in the group of MTC devices based on the entries in the forwarding table; and
   receiving a reply to the interest message from the one or more of the MTC devices.

3. The method of claim 2, further comprising excluding inactive MTC devices in the group of MTC devices when forwarding the interest message.

4. The method of claim 3, wherein the interest message is received from one of a MTC server and a MTC device not in the group of MTC devices.

5. The method of claim 3, further comprising selecting one or more of the MTC devices in the group of MTC devices having at least one of a highest sensing accuracy, strongest signal strength and largest remaining power of the MTC devices in the group of MTC devices, wherein the base station receives the reply from the selected one or more MTC devices in response to the interest message with a data packet including a content request in the interest message.

6. The method of claim 1, wherein the unique name of the group includes a type field identifying one or more sensing functions of the MTC devices, a main location field indicating a location of the MTC devices in the group, and a specific area field indicating an area within the main location field in which each MTC device in the group is located.

7. The method of claim 1, wherein the managing further comprises:
   receiving the information from the one or more newly connected MTC devices in the network;
   determining whether the newly connected one or more other MTC devices has one or more of the same functions as the multiple MTC devices previously included in the group;
   storing a second record identifying the one or more newly connected MTC devices, when the one or more newly connected MTC devices have a different function than the multiple MTC devices previously included in the group.

8. The method of claim 1, wherein the record includes the unique name, a list of the MTC devices in the group and one or more attributes identifying the MTC devices in the group.

9. A base station for machine type communication (MTC) in an information centric network, comprising:
   a memory storage comprising instructions; and
   one or more processors coupled to the memory that executes the instructions to:
     store a record identifying multiple MTC devices having one or more of the same functions, the multiple MTC devices forming a group with a unique name;
     manage the record based on information received from one or more MTC devices newly connected to the information centric network, the one or more newly connected MTC devices added to the group and having one or more of the same functions as the MTC devices previously included in the group;
     add, by the base station, one or more entries into a forwarding table, the entries including the unique name of the group of MTC devices associated with an address of a next hop towards the group of MTC devices; and
     publish a message in the information centric network, the message including the unique name of the group of MTC devices and the associated address of the next hop towards the group of MTC devices.

10. The base station of claim 9, the one or more processors coupled to the memory that further executes the instructions to:
    receive an interest message including the unique name of the group;
    match the group of MTC devices corresponding to the unique name in the interest message with the one or more entries in the forwarding table;
    forward the interest message to one or more of the MTC devices in the group of MTC devices based on the entries in the forwarding table; and
    receive a reply to the interest message from the one or more of the MTC devices.

11. The base station of claim 10, the one or more processors coupled to the memory that further executes the instructions to:
    exclude inactive MTC devices in the group of MTC devices when forwarding the interest message.

12. The base station of claim 11, wherein the interest message is received from one of a MTC server and a MTC device not in the group of MTC devices.

13. The base station of claim 12, the one or more processors coupled to the memory that further executes the instructions to:
    select one or more of the MTC devices in the group of MTC devices having at least one of a highest sensing accuracy, strongest signal strength and largest remaining power of the MTC devices in the group of MTC devices, wherein the base station receives the reply from the selected one or more MTC devices to the interest message with a data packet including a content request in the interest message.

14. The base station of claim 9, the one or more processors coupled to the memory that further executes the instructions to:
    receive the information from the one or more newly connected MTC devices in the network;
    determine whether the newly connected one or more other MTC devices has one or more of the same functions as the multiple MTC devices previously included in the group; and store a second record identifying the one or more newly connected MTC devices, when the one or more newly connected MTC devices have a different function than the multiple MTC devices previously included in the group.

15. A non-transitory computer-readable medium storing computer instructions for machine type communication (MTC) in a base station of an information centric network, that when executed by one or more processors, causes the one or more processors to perform:

storing a record identifying multiple MTC devices having one or more of the same functions, the multiple MTC devices forming a group with a unique name;

managing the record based on information received from one or more MTC devices newly connected to the information centric network, the one or more newly connected MTC devices added to the group and having one or more of the same functions as the MTC devices previously included in the group;

adding one or more entries into a forwarding table, the entries including the unique name of the group of MTC devices associated with an address of a next hop towards the group of MTC devices; and publishing a message in the information centric network, the message including the unique name of the group of MTC devices and the associated address of the next hop towards the group of MTC devices.

16. The non-transitory computer-readable medium of claim 15, further causing the one or more processors to perform:

receiving an interest message including the unique name of the group;

matching the group of MTC devices corresponding to the unique name in the interest message with the one or more entries in the forwarding table;

forwarding the interest message to one or more of the MTC devices in the group of MTC devices based on the entries in the forwarding table and receiving a reply to the interest message from the one or more of the MTC devices.

17. The non-transitory computer-readable medium of claim 16, further causing the one or more processors to perform:

excluding inactive MTC devices in the group of MTC devices when forwarding the interest message; and selecting one or more of the MTC devices in the group of MTC devices having at least one of a highest sensing accuracy, strongest signal strength and largest remaining power of the MTC devices in the group of MTC devices, wherein the reply is received from the selected one or more MTC devices in response to the interest message with a data packet including a content request in the interest message.

18. The non-transitory computer-readable medium of claim 15, the managing further causes the one or more processors to perform:

receiving the information from the one or more newly connected MTC devices in the network;

determining whether the newly connected one or more other MTC devices has one or more of the same functions as the multiple MTC devices previously included in the group; and storing a second record identifying the one or more newly connected MTC devices, when the one or more newly connected MTC devices have a different function than the multiple MTC devices previously included in the group.

* * * * *

UNITED STATES PATENT AND TRADEMARK OFFICE
CERTIFICATE OF CORRECTION

PATENT NO. : 10,862,858 B2
APPLICATION NO. : 15/936133
DATED : December 8, 2020
INVENTOR(S) : L. Dong Page 1 of 1

It is certified that error appears in the above-identified patent and that said Letters Patent is hereby corrected as shown below:

On the Title Page

Page 2/item (56) other publications (Column 2, Line 8), please change "Communicaiton" to -- Communication --.

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*